United States Patent Office 3,243,369
Patented Mar. 29, 1966

3,243,369
LUBRICANT CONTAINING MONO-AMINE TERMINATED POLYMER-ORGANO CLAY COMPOSITION
Henri G. G. Dekking, Garden Grove, Calif., assignor to Union Oil Company of California, Los Angeles, Calif., a corporation of California
No Drawing. Filed Sept. 12, 1961, Ser. No. 137,494
2 Claims. (Cl. 252—28)

This invention relates to mineral-organopolymer compounds wherein the polymer chain is terminally linked to the mineral surface.

In other aspects, this invention relates to compositions containing said mineral-organopolymer compounds.

Various minerals have been incorporated into natural and synthetic polymer compositions to achieve desired properties. As an example, clays have been used to treat natural and synthetic fibers, textiles, paper, etc. Clays, alumina, silica, etc., have also been used as filling and reinforcing materials for cast and molded plastics to impart high temperature strength and rigidity. Organophilic clays have been used to gel lubricating oils and form greases, drilling fluids, etc.

A disadvantage to use of the aforedescribed mineral fillers is their inertness to the polymer or organic matrix to which they are added. As a result, the minerals are difficult to incorporate into the matrix and often degrade related properties of the matrix.

It has been suggested that treating the mineral with a reactive organic compound, e.g., an aliphatic amine, to render the mineral organophilic would overcome this disadvantage. While such a treatment, indeed, does render the mineral more dispersible in the organic matrix, the properties of the filled matrix are not materially improved.

It has also been proposed that the mineral be chemically bonded to synthetic organic polymers to achieve improved properties over mineral filled polymers. Such mineral organopolymers could, in theory, be produced by copolymerization of a monomer surfaced mineral, e.g., 4-vinylpyridine clay with a vinyl monomer. The steric hindrance to this copolymerization, however, precludes this reaction and favors homopolymerization of the vinyl monomer.

It has also been suggested that organic polymers (polycations) be synthesized to have recurring reactive groups, e.g., amine groups, along their chains for bonding to mineral surfaces. An example of such a polymer is a styrene-4-vinylpyridine copolymer. The mineral-organopolymer obtained when the mineral and such a copolymer are reacted is a highly crosslinked material wherein the adjacent mineral surfaces, e.g., clay platelets, are crosslinked by the copolymer. Desired properties, e.g., the swelling of expanding lattice clays, are greatly impaired by this crosslinking. The polymer chain is also bound to the mineral surface along its length and is not spacially free and therefore loses many of its resin properties. The incorporation of many amine reactive groups into a polymer chain also renders the polymer hydrophilic.

It is an object of my invention to provide mineral-organopolymer compositions wherein the properties of the organopolymer are not impaired to achieve bonding to a mineral surface.

It is also an object of my invention to provide mineral-organopolymer compositions wherein the desired mineral properties are not impaired by its combination with the organopolymer.

It is a related object of my invention to treat and fill various organic matrices with the mineral-organopolymer compounds of my invention.

Other related objects will be apparent from the following description of my invention.

I have discovered that the preceding objectives are achieved by reacting an amine terminated organopolymer with a mineral possessing ion exchange properties so as to chemically bond the organopolymer to the mineral.

The nature of the organopolymer so reacted with the mineral remains entirely hydrophobic in contrast to the aforementioned polymer having recurring reactive, i.e., amine, groups along its chain. Because the amine terminated polymer has only a single reactive group per chain, it cannot crosslink adjacent clay platelets; an unavoidable result of the aforementioned polycations; and the swelling of the organoclay in organic solvents is not impaired. Because the polymer chain is terminally attached to the mineral surface, the bulk of the polymer remains spacially free and retains a noncrosslinked nature.

The amine terminated polymers of my invention are prepared by anionic chain polymerization or copolymerization of the desired monomers. This polymerization is initiated by the amide ion which becomes an integral part of the polymer. The polymerization media is prepared by addition of an alkali metal amide to liquid ammonia or by addition of an alkali metal, e.g., sodium, potassium, cesium, etc., together with a suitable catalyst to liquid ammonia to form the amide ion in situ.

Any of the following monomers can be polymerized or copolymerized in this manner to produce polymer and copolymer chains having a terminal amine group: styrene, methyl methacrylate, acrylonitrile, methacrylonitrile, vinyl acetate and ethyl acrylate. Examples of amine terminated polymers so prepared are: polystyrene, polymethyl methacrylate, polyacrylonitrile, styrene-acrylonitrile copolymer, polymethacrylonitrile, styrene-methacrylonitrile copolymer, acrylonitrile-methacrylonitrile copolymer, polyvinylacetate, polyvinyl acrylate, etc.

The polymerization is conducted in liquid ammonia at atmospheric or superatmospheric pressures so as to maintain liquid phase conditions. Generally, between about 1 and 200 atmospheres can be employed. The polymerization temperature is relatively low, between about $-75°$ and about $120°$ C., with lower temperatures tending to favor high molecular weight polymers.

Precautions should be taken to eliminate any water, oxygen or air from the liquid ammonia which would consume the amide catalyst. If desired, the ammonia can be purified of these ingredients by distillation in the presence of sodium or potassium metal.

To generate the amide in situ, between about 0.01 and 10 weight percent (based on ammonia) of an alkali metal, e.g., metallic sodium or potassium, free of oxide coating, is added to liquid ammonia together with a slight amount, 0.01 and 10 weight percent, of a catalyst for the amide formation. Suitable catalysts include the Group VIII metals and anhydrous metal salts, e.g., ferric nitrate, cobalt nitrate, platinum gauze, etc. During formation of the amide, the temperature of the liquid ammonia is preferably maintained between about $-75°$ and $-330°$ C. by cooling. At these temperatures, the amide ion forms within several minutes to several hours, its formation being indicated by disappearance of the blue coloration initially obtained upon addition of the alkali metal.

The polymerization media can also be prepared simply by the addition of between about 0.005 and 5 weight percent (based on ammonia) of commercially available alkali metal amides, e.g., potassium amide, sodium amide, etc., to liquid ammonia. This method is preferred because of its simplicity.

The amide solution, if not prepared in the reaction vessel, is transferred thereto and the desired monomer or mixture of monomers is slowly introduced into the liquid in the reaction vessel. The concentration of monomer can be varied as desired between about 5 and 70 percent. During introduction of the monomer and subsequent polymerization, the reaction medium is stirred rapidly and cooled by circulation of a refrigerant, e.g., acetone, methylene chloride, Freon, etc., through a cooling coil in the reaction vessel or the reactants can be maintained at atmospheric refluxing temperature (—33° C.) with an acetone-Dry Ice cooled reflux condenser. An inert, preferably nitrogen, atmosphere is maintained in the reaction vessel. The rate of polymerization can be visually determined by observing the rate of formation of the insoluble polymer and depends on the styrene and amide ion concentration, and temperature; an increase in any of the aforementioned causing an accompanying increase in polymerization rate.

The polymerization is generally complete within several minutes to several hours after addition of the monomers, and can be determined when no further precipitation occurs as visually observed or as evidenced by no further increase in the viscosity or thickness of the reaction media. Polymers having number molecular weights between about 1000 and 200,000 can be prepared by this technique.

The crude polymer can be recovered by draining the reaction media through filtration means and the filtered solid purified by washing with water to remove residual ammonia and catalyst. In another technique, the reaction zone temperature can be raised to distill the ammonia and leave a residue of polymer and unpolymerized monomer. The residue is stirred with methanol, the slurry filtered and the filter cake washed with water and methanol.

In general, any ion exchange solid can be reacted with the amine terminated polymers of my invention, including various synthetic organic solids such as the sulfonated phenol-formaldehyde resins, sulfonated polystyrene resins, etc. The preferred ion exchange solids are inorganic so as to impart an inorganic nature to the polymers, such as stiffness, hardness, high temperature strength, insolubility in organic solvents, etc.

Various inorganic solids possess the property of strongly adsorbing ions by apparent chemical bonding through a base exchange reaction. These inorganic solids are commonly referred to as inorganic ion exchange solids and include various oxides and hydroxides of alkaline earth metals, iron, aluminum, silicon, vanadium, as well as the various synthetic and naturally occurring aluminosilicates, e.g., clays, zeolites, molecular sieves, etc.

Of the aforementioned, I prefer to use any of the various clays as a source of ion-exchange solid. The nature and characteristics of clay solids are greatly varied and the proper selection of clay solid permits one to obtain mineral-organo-polymers having unique and greatly varied properties. For the purposes of my invention, however, clays can be classified into the non-swelling types and the swelling or expanding lattice type.

The non-swelling types include illite having a three-layer non-expanding lattice; kaolinite, nacrite, dickite, anauxite, halloysite, endellite, etc., having a two-layer crystal; allophane, an amorphous solid; chlorite, mica, brucite, etc., having mixed layers; and attapulgite, sepiolite, polygorskite, having a chain-like or fibrous structure.

The expanding lattice clays include montmorillonite, sauconite, vermiculite, nontronite, saponite, hectorite, etc., which have a three layer crystal. These clays are commonly found in admixture in bentonite clays which have an aluminum oxide content less than about 20 percent. The bentonite clays also have a high base-exchange capacity, commonly between about 80 and 100 milliequivalents per 100 grams of air-dried clay. Swelling or expanding lattice type bentonites are found in Wyoming, South Dakota, Montana, Utah, Nevada and California.

The clay is usually found in a form wherein the base-exchange sites are occupied with alkali or alkaline earth metals and in this "as-received" form can be base exchanged with the amine terminated polymers to form the mineral-organopolymer products of my invention. In this embodiment, the organic ammonium salt of the amine terminated polymer is formed by the addition of an acid such as hydrochloric, acetic, phosphoric, etc., to a solution of the polymer in a suitable solvent such as benzene, chloroform, carbon tetrachloride, dimethyl formamide, toluene, methyl ethyl ketone, dichlorobenzene, etc. Other organic ammonium salt forming agents include esters such as methyl sulfate, triethylphosphate, ethyl nitrate; alkyl halides such as methyl chloride, ethyl fluoride, and the like. By any of these methods the amine terminated polymer is converted to a salt which, upon addition of water, gives rise to positively charged cations. The solvent-water dispersion of amine terminated polymer cations is then added to an aqueous dispersion of the "as-received" clay, whereupon the clay-organopolymer compound is formed as illustrated by the following, wherein M designates a clay platelet and B designates an amine terminated polymer:

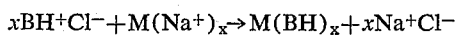

The resultant clay-organopolymer is insoluble in water and in organic liquids. It is readily separated from the aqueous-solvent mixture by filtration, washed and dried. Any uncombined polymer is leached from the clay-organopolymer by treatment with one of the aforementioned solvents for the polymer.

In a preferred embodiment, the "as-received' clay is converted to the hydrogen form by a suitable treatment such as washing with an acid, e.g., hydrochloric, acetic, phosphoric, etc. In another technique, an aqueous suspension of the clay can be passed over an hydrogen charged ion exchange column such as an Amberlite IR-120 to exchange the alkali and alkaline earth ions with hydrogen ions. A strongly acidic clay can be obtained by ion exchange of the alkali cations with ammonium ions over an ammonium charged resin, removal of the anions in a second ion exchange column and finally, treatment with a hydrogen charged resin to convert the ammonium ions to hydrogen. The resultant aqueous suspension of hydrogen clay is thereafter contacted with the amine terminated polymer solution to form the clay-organopolymer compounds of my invention. The overall reactions are as follows:

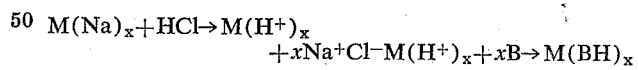

A sufficient amount of organopolymer is employed to ensure complete reaction with the base-exchange sites on the mineral surface. Depending on completeness of the reaction and the molecular weight of the organopolymer, between about 1 and about 80 weight percent of the mineral-organopolymer consists of the organopolymer. The resulting solid, after washing with a polymer solvent to extract any uncombined polymer, is dried and powdered to the desired fineness.

As previously mentioned, the mineral-organopolymers of my invention are useful for a variety of purposes. They comprise a very useful molding powder wherein the mineral portion is in chemical combination with the organic polymer. As a result, molded products can be obtained which have great solvent resistance to practically all organic solvents, and have a high degree of high temperature strength and hardness. Because the clay is chemically bonded to the polymer, molded products obtained therefrom have a higher degree of clarity than do the polymers filled with comparable amounts of clay. Because the polymer chain is spacially free, the clay-organopolymer retains many of the molding properties of non-crosslinked vinyl resins.

The clay-organopolymer compounds of my invention also have very excellent gelling properties in organic media. To obtain gelation, the swelling or expanding lattice type of clay is used, such as the aforementioned montmorillonite, sauconite, vermiculite, nontronite, saponite, hectorite, etc. A very suitable raw material for use in this embodiment is Wyoming bentonite. Because the polymer chain has only a single reactive amino group which bonds to the clay platelet, there is no inhibition of the clay swelling due to crosslinking of adjacent clay platelets by the polymer. Consequently, clay-organopolymers can be obtained which swell to 5 to 25 times their original volume. Because of this property, these expanding lattice clay-organopolymer compounds are excellent gelling agents for paints, inks, drilling fluids, greases, etc.

Lubricating oils can be thickened to any degree by the addition of controlled amounts of my clay-organopolymer compound to prepare special high viscosity oils and greases. The clay-organopolymer for use in this embodiment preferably should be free of any uncombined polymer or monomer which dilutes the gelation properties of the organoclay. Particularly useful are clay-organopolymers wherein the organopolymer constitutes between about 40 and 80 weight percent of the compound since these clay-organopolymers are very effective gelling agents, even at low concentrations such as 5 to 20 weight percent in oils. A very useful amine terminated polymer for use in this embodiment is amine terminated polysytrene which can be obtained in the aforedescribed polymerization with a number average molecular weight between about 5,000 and 30,000. Because of the aromatic nature of this polymer, greases and high viscosity oils can be readily obtained from aromatic as well as aliphatic oils. The aromatic portion of the clay-polystyrene compound also stabilizes the oil or grease so formed to gamma and beta radiation and thereby supplies the industry with radiation resistant lubricants.

To thicken a lubricating oil, clay-organopolymer is added to the selected in an amount constituting between about 1 and 50, preferably between about 5 and 20 weight percent of the final composition. In general, the consistency of the thickened oil and grease increases with increasing amounts of my material. Greases so obtained are thermally stable and are reversible when heated to elevated temperatures and cooled, retaining their properties without thinning. This property is in marked contrast to the irreversibility of greases prepared from aliphatic amine-clay adducts taught by the prior art.

Any suitable lubricating oil can be used as the organic matrix to form thickened oils and greases. Oils derived from petroleum are of course widely employed for lubrication and are used in my invention. Oils derived from Fischer-Tropch synthesis, olefin polymerization, olefin-aromatic condensation, hydrogenated asphalt and coal derivatives, halogenated hydrocarbons, polysilicone oils, etc., can all be used to form thickened oils and greases.

The clay-organopolymer is admixed with the lubricating oil in the manner conventional in the lubricating art to prepare bodied oils and greases. Generally, these techniques employ severe agitation in a mixing mill, roller mill, etc., with or without heating. In some instances a dispersing aid, i.e., an organic solvent can be added to initiate the swelling of the clay. Suitable agents are acetone, formamide, benzene, etc. Use of volatile solvents such as acetone is preferred since the solvent can be removed from the finished grease simply by heating to about 100°–250° F.

The various swelling clay-organopolymer compounds can also serve as gelling agents for coating compositions, e.g., non-running paints, inks, etc. In preferred embodiments, the organopolymer is of the same type as the base of the paint. Thus, for example, acrylic latex paints can be obtained having non-dripping properties by the presence of between about 3 and 15 weight percent of the swelling clay-amine terminated polyacrylic compound, e.g., hectorite-polymethylmethacrylate, montmorillonite-polyethylacrylate, etc. The organoclay additive thus reinforces the paint structure since it, too, is an acrylic polymer. In a similar manner, clay-polystyrene compounds are excellent gelling and reinforcing additives for polystyrene latex coatings used for various decorative and sealing purposes. Because of the excellent water and solvent resistance, such coatings can be used to obtain a high degree of water and solvent resistance for walls, over sheet rock, gypsum board, etc.

Oil base and emulsion base drilling fluids can be produced by dispersing the swelling clay-organopolymer compounds of my invention in a suitable hydrocarbon, generally a crude petroleum, distillate or residuum or mixture thereof, e.g., gas oils, kerosene, fuel oil, Diesel oil, etc. The clay-organopolymer is readily dispersible in the hydrocarbon oil and forms drilling fluids having desirable gel-strength, thixotropy and viscosity when used in amounts between about 0.5 to 15 weight percent of the fluid. In the manner conventional to the art, weighting agents such as barytes, iron oxides, etc., can be added to increase the fluid's density. Hydration inhibitors, e.g., salts of the alkali and alkaline earth metals can be added with auxiliary wall-building agents such as asphalt or clay. Fluid loss agents can also be added. Emulsion base drilling fluids can also be gelled in a similar manner by incorporation of the clay-organopolymer in the oleaginous phase which can constitute the internal or external phase of the emulsion in the manner conventional to the art.

The non-swelling clay-organopolymers are excellent ingredients for coating applications for use in synthetic waxes, for textiles, for paper, etc. Self-polishing waxes generally are comprised of a polystyrene latex, a styrene-acrylate copolymer latex, a polymethyl methacrylate, polymethylacrylate and polyethyl acrylate latex or mixtures thereof. Frequently the latexes, which are dispersions of very finely divided resin having particle sizes in the range of about 0.01 to about 1 micron in diameter, are admixed with wax emulsions, water-soluble alkyd resins or polyethylene emulsions in amounts constituting between about 10 and 90 percent of the final composition. The incorporation of my non-swelling clay-organopolymers in the aforementioned waxes containing polystyrene or polyacrylic latexes or their direct substitution therefor will provide waxes having greatly increased solvent resistance with a hard glossy surface very resistant to scuffing. Examples of suitable non-swelling clay- and mineral-organopolymers for this application are: kaolin-polystyrene, halloysite-polymethyl methacrylate, nacrite-polyethylacrylate, silica gel-poymethylacrylate, kaoin-styrene methyl methacrylate copolymer, etc.

Synthetic resins, such as the polyacrylics have been used to treat paper to impart wet and dry strength and to cement clays to the paper fibers. Although a fair degree of success has been achieved, the technique can be improved by the substitution of the non-swelling clay organopolymers of my invention. Because the clay is chemically bonded to the organopolymer, the treated paper is very resistant to water and to solvents which would otherwise dissolve the polymer. The chemical bonding of the clay greatly reduces the vapor pressure of the polymer and eliminates any traces of residual odor, thereby permitting use of the paper for food packaging, even when subjected to elevated temperatures. The clay-organopolymer is compounded for this use to contain between about 70 to 99 percent clay, the remainder being the amine terminated acrylic resin. Preferably, the clay will comprise between about 90 and 98 percent of the compound. The following clay-amine terminated acrylic resins are well suited for this application: kaolin-polyacrylonitrile, kaolin - polymethylmethacrylate, nacrite-polymethacrylonitrile, etc.

The various non-swelling clay- and ion exchange mineral-polyacrylics of my invention can be used to coat fabrics in amounts between about 0.05 and 10 weight percent solids using coating techniques known in the art. The coating of the fabrics greatly improves their hand and body, extends their life, imparts oil and grease resistance and greatly improves their acceptance of dyes and fabric coloring agents. In other embodiments, greater amounts of the clay or mineral-polyacrylic compounds can be used to back coat upholstery fabrics, rugs, etc., to produce resilient, long wearing textiles. Any of the previously mentioned non-swelling clay- or ion exchange mineral-polyacrylics are useful for this application.

One problem long associated with synthetic polyacrylonitrile fibers has been their poor dye acceptance and very low hot bar sticking temperature. These properties can be greatly improved by the addition of my clay- or mineral-organopolymers to the polyacrylonitrile spinning solution. Selection of a clay- or mineral-polyacrylonitrile compound will yield a fiber having no inert or foreign organic material to weaken the fiber. Spinning solutions for acrylonitrile fibers generally comprise a suitable solvent, e.g., dimethyl formamide, dimethyl acetamide, ethylene carbonate, succinodinitrile, etc., having dissolved therein polyacrylonitrile or copolymers containing at least about 80 percent acrylonitrile with any of the following monomers: methyl methacrylate, vinyl acetate, methyl acetate, vinyl chloride, etc. In this spinning solution can be dispersed the bentonite-polyacrylonitrile, kaolin-polymethyl methacrylate, hectorite-polyacrylonitrile, etc., of my invention. The clay will thus become an integral portion of the fiber structure and greatly improve its properties.

While the preceding illustrates various uses for the mineral-organopolymer products of my invention, it is by no means intended to be an exhaustive listing of such uses. Various other uses are contemplated, e.g., fillers for synthetic rubbers such as the acrylonitrile type, organophillic fillers for plastics generally, etc.

The following examples will illustrate preparation of my mineral-organopolymer compositions:

Example 1

A three liter resin flask is fitted with a reflux condenser, a mechanical stirrer and a nitrogen and ammonia inlet tube. The flask is immersed in a Dry Ice-acetone bath and two liters of anhydrous liquid ammonia is slowly introduced. One gram of sodamide is then added and the flask contents stirred. The reflux condenser is cooled with Dry Ice and acetone and the liquid ammonia permitted to reach its atmospheric reflux temperature, −33° C. Nitrogen is continuously introduced into the flask to exclude air. Thereupon, 250 milliliters of dry styrene is slowly added and the flask contents are stirred for 3 hours. Thereafter, the reflux condenser is removed and the ammonia is distilled off. The residue in the flask is slurried in methanol, filtered and the filtered solid is washed with water and methanol. A sample of the solid is dissolved in benzene and the solution is titrated for amine groups, the number of amine groups so determined indicate the polystyrene to have a number molecular weight of 10,000. When the experiment is repeated at lower temperatures, e.g., −60° C. and −70° C., the polystyrene can be obtained having molecular weights of 20,000 to 75,000. Polymethacrylonitrile having a molecular weight between about 75,000 and 200,000 is readily obtained when the experiment is repeated and methacrylonitrile added in lieu of styrene. In a similar manner, polymethyl methacrylate, polyacrylonitrile, styrene-acrylonitrile copolymer are obtained having number molecular weights between about 2,500 and 100,000.

Example 2

Wyoming bentonite, chiefly montmorillonite, having a particle diameter between about 0.05 and 2.0 microns and a base exchange capacity of 100 milliequivalents per 100 grams is dispersed in distilled water and the suspension percolated through a column of ammonium charged cation exchange resin (Amberlite IR–120). The effluent is percolated through a column of an anion exchange resin (Amberlite IRA–400) and then through a hydrogen exchange resin (IR–120). The resultant aqueous suspension of hydrogen montmorillonite has a pH of about 2. In a similar manner a hydrogen kaolinite is prepared with a Georgia kaolin clay and has a pH of 3.5.

Example 3

To one liter of the aforedescribed clay dispersion containing 20 grams of hydrogen montmorillonite is added one liter of a dimethyl formamide solution containing 50 grams of the aforedescribed amine terminated polystyrene having a number molecular weight of 10,000. The resultant mixture is stirred in a Waring blender for one hour, then filtered and the filter cake is dried in an oven at 60° C. The solid is thereafter powdered and leached with benzene to remove any unreacted polystyrene and the residue is dried. This residue contains 45 weight percent unextractable polystyrene, based on carbon analysis. Titration of a benzene dispersion of the solid indicates an absence of free or unreacted amine groups. This solid is hydrophobic and water repellent. When immersed in benzene it swells about 15-fold.

In a similar manner, an aqueous dispersion of hydrogen kaolin is reacted with amine terminated polystyrene to obtain a clay-organopolymer solid having about 2.1 percent polystyrene. This solid is also water repellant and will remain suspended in organic solvents for weeks. A one liter aqueous dispersion of Wyoming bentonite is acidified by the addition of 0.9 milliliter of concentrated hydrochloric acid. Thereafter a one liter solution containing 20 grams of amine terminated polystyrene in one liter of dimethyl formamide is added. The resulting solid is worked up in the manner previously described and contains about 17 percent polystyrene which cannot be extracted with toluene. Similar results are obtained when about 1 milliliter of concentrated hydrochloric acid is added to the dimethyl formamide solution of polystyrene and the resultant solution of polystyrene ammonium chloride salt is added to the aqueous dispersion of bentonite.

Example 4

A montmorillonite-polystyrene solid obtained as described in Example 3 is powdered and the powder molded under 1,250 p.s.i. in a press heated to 350° C. The resulting sheet had a smooth hard surface which is water repellant and resistant to organic solvents.

Example 5

A montmorillonite-polystyrene having about 50 percent unextractable polystyrene with an organic polymer number weight of 16,000 is employed as a gelling agent for various mineral and synthetic oils. This organoclay has a c-axis spacing of about 13 A.

The organoclay is admixed with the oils at ambient temperature using a three roller paint mill in an amount to provide about 16.7 weight percent in the final product. The greases so obtained were reversible, i.e., when heated to elevated temperatures 200°–350° F., and cooled, they retained their initial consistency. The consistencies of the greases so obtained were:

| Sample | Oil stock | Penetration ASTM at 77° F. |
|---|---|---|
| 1 | Refined mineral oil, Duosol, Viscosity of 500 SSU at 100° F. | 275 |
| 2 | Synthetic oil, diisooctyladipate | 305 |
| 3 | Mixture of equal parts of oil stocks 1 and 2 | 208 |
| 4 | Arochlor 1254, chlorinated biphenyl | 223 |

The preceding examples are intended to illustrate a method of preparation of the mineral-organopolymers of my invention and some of the properties of these materials. The examples are not to be construed as unduly limiting of my invention which comprises the steps and ingredients, or obvious equivalents thereof, set forth in the following claims.

I claim:

1. A lubricant comprising a thickened hydrocarbon oil having intimately dispersed therein between about 5 and about 20 weight percent of an organoclay comprising an expanding lattice clay having an ion exchange capacity and being bonded at its ion exchange sites to polystyrene having a single, terminally positioned, primary amine group; said clay and said polystyrene being bonded through the ammonium ion of said amine group.

2. The composition of claim 1 wherein said clay is montmorillonite.

References Cited by the Examiner

UNITED STATES PATENTS

| | | | |
|---|---|---|---|
| 2,531,427 | 11/1950 | Hauser | 260—448 |
| 2,608,555 | 8/1952 | Bullitt | 260—88.7 |
| 2,795,545 | 6/1957 | Gluesenkamp | 252—28 |
| 3,012,050 | 12/1961 | Fox | 260—40 |

OTHER REFERENCES

Emerson: Nature (London), vol. 186, pages 573–4, May 14, 1960.

Higgonson et al.: J. Chem. Soc., 1952, 760–779.

WILLIAM H. SHORT, *Primary Examiner.*

HAROLD N. BURSTEIN, LOUISE P. QUAST,
*Examiners.*

J. C. MARTIN, C. A. WENDEL, *Assistant Examiners.*